SWITCHING ASSEMBLY INCLUDING RESILIENT SWITCH MOUNTING MEANS
Filed Nov. 9, 1961
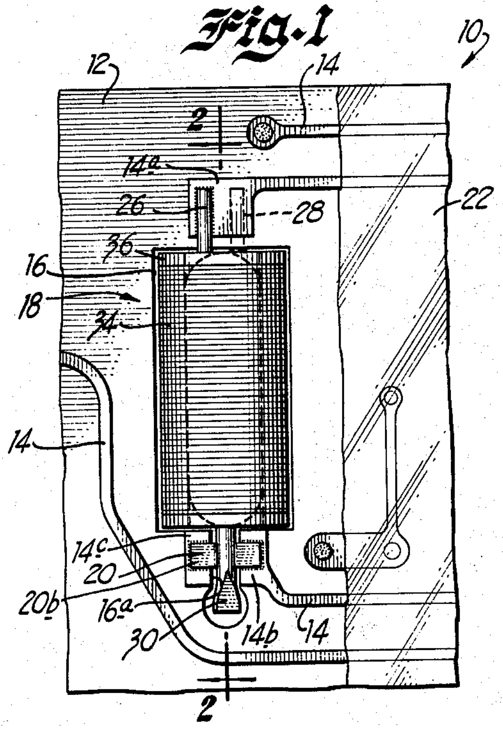
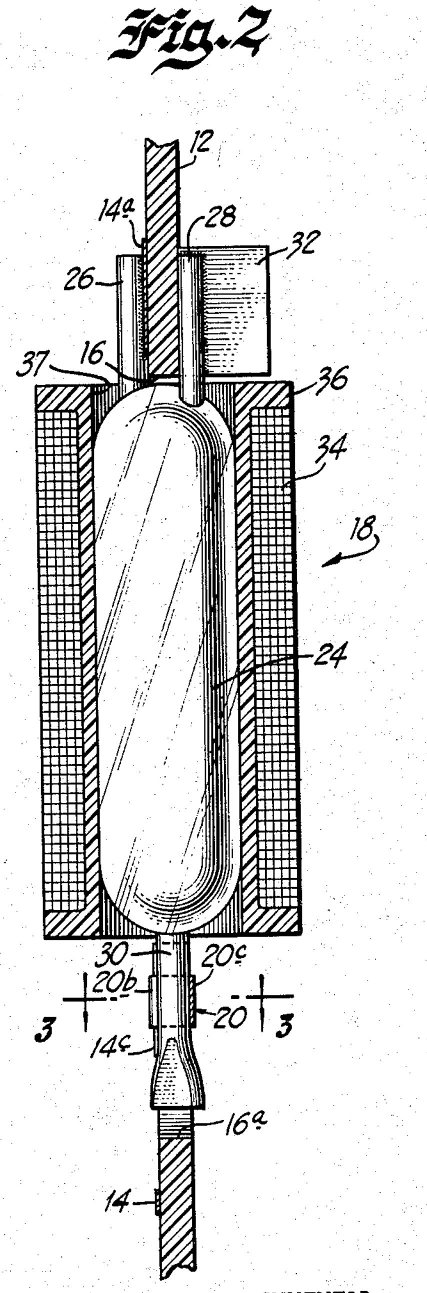
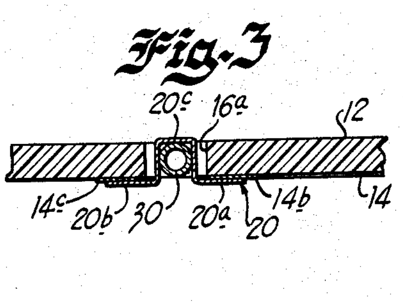
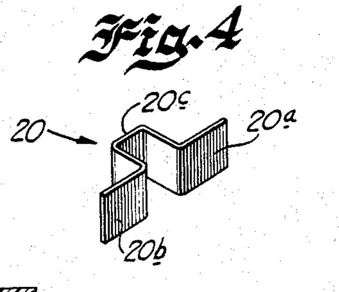
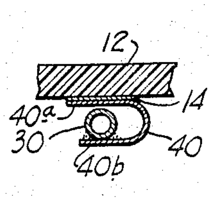
Fig. 5
INVENTOR.
ARTHUR J. KODA AND
BY RICHARD W. OTTMAN
Mason, Kolehmainen, Rathburn and Wyss
ATTORNEYS.

United States Patent Office 3,114,080

Patented Dec. 10, 1963

3,114,080
SWITCHING ASSEMBLY INCLUDING RESILIENT SWITCH MOUNTING MEANS

Arthur J. Koda, Morton Grove, and Richard W. Ottman, Chicago, Ill., assignors to C. P. Clare & Company, Chicago, Ill., a corporation of Delaware Filed Nov. 9, 1961, Ser. No. 151,269
8 Claims. (Cl. 317—101)

This invention relates to a switch assembly and, more particularly, to a switching assembly including new and improved means for mounting a sealed switch unit on a printed circuit panel.

The copending applications of Arthur J. Koda Serial No. 731,390, filed April 28, 1958, now Patent No. 3,038,976 and Serial No. 7,157, filed February 8, 1960, now Patent No. 3,076,878, disclose switching assemblies in which sealed switch units are mounted on and secured to a printed circuit panel. In the assemblies shown in these applications, the elongated dielectric or glass housing of the sealed switch unit is disposed within an opening in the panel with one or more terminals projecting from one end of the housing resting on one or both surfaces of the panel adjacent portions of the printed circuit pattern. The header or header terminal extending outwardly from the other end of the glass housing is disposed within a narrow portion of the opening. The switch unit is then electrically connected to the printed circuit pattern and mechanically secured to the panel by making a soldered connection between the terminals and the adjacent portions of the printed circuit pattern.

This type of construction provides a rigid connection between the board and the sealed switch unit through the connected terminals, and, it has found extensive commercial acceptance. However, in certain applications, the dielectric panels, which are somewhat flexible, are subjected to relatively large mechanical stresses that flex or distort the panels from their substantially uniplanar configuration. At times, this distortion results in the application of forces to the terminals, particularly the header terminal, that tend to break the seal between the terminal and the glass envelope or the connection between the terminal and the printed circuit pattern.

Accordingly, one object of the present invention is to provide a new and improved switching assembly.

Another object is to provide a switching assembly including new and improved means for mounting a sealed switch unit on a printed circuit panel.

Another object is to provide a switching assembly including a flexible and electrically conductive means for supporting a sealed switch unit within an opening in a printed circuit board.

A further object is to provide a switching assembly including flexible or resilient means for supporting a terminal of a sealed switch unit within an opening in a dielectric panel, one portion of the supporting means being secured to the surface of the printed circuit panel and the other portion being secured to the terminal within the opening in the panel.

In accordance with these and many other objects, an embodiment of the present invention includes a switching assembly including a generally uniplanar dielectric panel on one or both surfaces of which a printed circuit pattern is formed. The dielectric panel is provided with an opening in which the elongated glass envelope of a sealed switch and the operating winding therefor are mounted. One or more terminals projecting from one end of the housing extend outwardly beyond the opening and are adapted to engage the printed pattern circuit on one or both sides of the panel. An additional terminal or header terminal projecting from the other end of the glass envelope is disposed within a narrow portion of the opening.

To provide means for cushioning or preventing the application of excessive mechanical stresses to this header terminal, a flexible or resilient and electrically conductive supporting means is provided having a pair of end portions which rest on the adjacent surface of the panel. A central and generally U-shaped depending portion on the supporting means is disposed within the narrow portion of the opening to receive the header terminal of the sealed switch unit.

During the soldering operation in which the terminals at the other end of the elongated housing are secured to the printed circuit pattern, the header terminal is secured to the bight of the depending U-shaped portion, and the ends of the supporting means are secured or soldered to the adjacent portions of the printed circuit pattern. In this manner, the header terminal is flexibly or resiliently connected to the panel to prevent the application of excessive mechanical stresses or forces thereto that would tend to injure the seal between the header and the glass envelope or the connection between the printed circuit panel and the header terminal.

In a second embodiment in which the printed circuit pattern can be provided on only one side of the dielectric panel, the opening is formed to receive only the glass envelope and the winding, and the terminals at both ends of the envelope are positioned adjacent a surface of the panel. To provide a flexible connection for at least one of the terminals, a generally U-shaped flexible and electrically conductive supporting member is secured at one end to a conductive layer of the printed circuit pattern and at its other end to the terminal to be supported. Thus, the supporting member electrically connects the terminal to the printed circuit and supports the switch on the panel by providing a flexible or stress absorbing connection for the sealed switch unit.

Many other objects and advantages of the present invention will become apparent from considering the following detailed description in conjunction with the drawings in which:

FIG. 1 is a plan view of a portion of a switching assembly embodying the present invention;

FIG. 2 is an enlarged sectional view taken along line 2—2 in FIG. 1;

FIG. 3 is a sectional view taken along line 3—3 in FIG. 2;

FIG. 4 is a perspective view of a flexible supporting element included in the switching assembly; and FIG. 5 is a sectional view of another embodiment of a flexible support for a sealed switch unit.

Referring now more specifically to FIGS. 1–4 of the drawings, therein is shown a switching assembly, indicated generally as 10, which includes a generally uniplanar dielectric panel 12 on one or both surfaces of which a printed circuit panel including a plurality of conductive segments 14 is formed. The dielectric panel 12 is formed with an opening 16 in which is mounted a sealed switch unit, indicated generally as 18, that is mechanically mounted on and electrically connected to the printed circuit pattern by soldering or otherwise connecting the terminals of the sealed switch unit to the conducting layers 14 of the printed circuit pattern. An electrically conductive and flexible or resilient supporting element 20 connects at least one of the terminals of the sealed switch unit 18 to the panel 12 to prevent the transmission of mechanical forces and stresses thereto. If desired, both surfaces of the panel 12 and the components carried thereon can be mechanically protected and electrically insulated by bonding a thin layer 22 of flexible dielectric material thereto.

The printed circuit panel 12 can be formed of any suitable dielectric material used in making printed circuits and is provided with the openings 16 of a configuration designed to receive the sealed switch unit 18.

One end of the opening 16 is provided with a narrow portion 16a for receiving one terminal of the sealed switch unit 18. One or both surfaces of the panel 12 is provided with the printed circuit pattern including the conducting layers or segments 14 by the use of any of the methods well known in the art, such as those referred to in the above identified copending Koda applications. One of the segments 14 is provided with an enlarged portion 14a disposed adjacent the upper end of the opening 16 for establishing a connection to one of the terminals of the sealed switch unit 18. Similarly, another segment or layer 14 of the printed circuit pattern is provided with an enlarged portion 14b disposed adjacent one edge of the narrow portion 16a of the opening. This portion and another portion 14c that is positioned adjacent the opposite edge of the narrow portion 16a are used to establish a connection to the support element 20.

The sealed switch unit or assembly 18 can comprise one of the "mercury" type or "dry" type constructions well known in the art. In general, these switches can include an elongated dielectric or glass envelope 24 (FIG. 2) from the upper end of which two terminals 26 and 28 extend. An armature located within the envelope 24 and secured to a header or header terminal 30 is disposed between the inner ends of the terminals 26 and 28 and is operable, upon the application of an operating field, to move out of engagement with one of the terminals 26 or 28 and into engagement with the other one of these terminals. In the particular type of sealed switch unit illustrated in the drawings, a permanent magnet 32 is positioned adjacent the terminal pin 28 to render the switch unit 18 single-side-stable. The magnetic field provided by the bias magnet 32 has a greater effect on the magnetic circuit including the magnetic terminal pin 28 and tends to hold the armature carried on the header terminal 30 in engagement with the terminal 28. When a suitable operating field is applied to the switch unit 18, the armature is moved out of engagement with the terminal 28 and into engagement with the terminal 26. To provide an operating field for the switch unit 18, a coil 34 is wound on a bobbin or coil form 36 having an axially extending opening 37 in which the dielectric envelope 24 is inserted. The leads to the winding or coil 34 can be connected to two segments 14 of the printed circuit pattern on the panel 12.

When the switching assembly 10 is fabricated, the panel 12 is provided with the opening 16 and the printed circuit pattern, and the winding 34 and bobbin 36 are mounted on the dielectric housing or envelope 24. The sealed switch unit 18 is then disposed in the opening 16 with the terminal 26 engaging the enlarged portion 14a of the conductive segment 14 and with the terminal 28 disposed adjacent the other or lower surface of the panel 12. The biasing magnet 32 can be secured to the terminal 28 at this time or prior to the insertion of the sealed switch unit 18 into the opening 16. If desired, the lower surface of the panel 12 can be provided with an additional enlarged portion on one of the conductive segments 14 adjacent the terminal 28 and the magnet 32. With the sealed switch unit disposed within the opening 16, the terminal or header 30 lies within the narrow portion 16a of the opening. This terminal is mechanically connected to the panel 12 and is electrically connected to the printed circuit pattern by the use of the support means 20.

The supporting element or means 20 (FIG. 4) includes two generally flat end portions 20a and 20b and a depending and generally U-shaped central portion 20c. When the header terminal 30 is to be connected to the switching assembly 10, the support member 20 is placed in the narrow portion 16a of the opening 16 with the end portions 20a and 20b resting on the conductive portions 14b and 14c, respectively, and with the depending central portion 20c disposed within the opening 16a. The header terminal 30 is disposed within the central portion 20c to rest on its bight portion or transverse wall.

The terminal 26 is connected, as by soldering, to the enlarged portion 14a to mechanically connect this terminal to the panel 12 and to provide an electrical connection between the conductive segment 14 and this terminal. Similarly, if a conductive segment is provided adjacent the terminal 28, this terminal and the magnet 32 can be soldered to the conductive printed circuit pattern. The terminal 30 is soldered to the bight and adjacent leg portions of the depending central portion 20c of the support member, and the end portions 20a and 20b are connected to the enlarged portions 14b and 14c, respectively. The support means 20 is formed of electrically conductive and resilient or flexible material so that the segments 14b and 14c are electrically interconnected and the terminal 30 is connected to the printed circuit pattern. Because of the flexibility of the support means 20, the stresses produced by distorting the somewhat flexible dielectric panel 12 are absorbed in the floating or resilient mounting for the header terminal 30 and are not transmitted to this terminal. Thus, the possibility of breaking the connection between the terminal 30 and the printed circuit pattern and the possibility of damaging the seal between the dielectric or glass envelope 24 and the header terminal 30 are avoided.

Another embodiment of a flexible or stress absorbing means for supporting a terminal of a sealed switch unit adjacent the surface of a dielectric panel rather than within an opening in the panel is illustrated in FIG. 5 of the drawings. This means includes a generally U-shaped supporting member 40 formed of an electrically conductive and flexible or resilient material.

When the sealed switch 18 is to be mounted on the panel 12 with all of the terminals 26, 28 and 30 disposed above or adjacent one surface of this panel, the opening 16 is formed without the narrow portion 16a so as to receive only the dielectric housing 24 and the winding 34. The sealed switch unit 18 is mounted on the panel 12 with the envelope 24 and the winding 34 in the opening 16 and with the terminals 26, 28 and 30 disposed adjacent or resting on the adjacent portions of the conductive layers 14. The terminals 26 or 28 can be connected, as by soldering, to the printed circuit in the manner described above.

To provide a flexible connection for the terminal 30, one leg 40a of the supporting member 40 is connected to an adjacent portion of one of the conductive layers 14, and the terminal 30 is positioned within the U-shaped member 40. This terminal is then connected, as by soldering, to the inner wall of the other leg 40b of the member 40 at a point spaced from its bight. The member 40 not only electrically connects the terminal 30 to the printed circuit but also provides a stress and shock absorbing physical connection between the panel 12 and the sealed switch unit 18.

Although the present invention has been described with reference to two embodiments thereof, it is obvious that numerous other modifications and embodiments can be made by those skilled in the art that will fall within the spirit and scope of the principles of this invention.

What is claimed as new and desired to be secured by Letters Patent of the United States is:

1. A switching assembly comprising a dielectric panel having an opening therein, a conductive circuit pattern on said panel, a sealed switch unit including a sealed dielectric envelope from which a plurality of rigid terminals extend, said switch unit being disposed in said opening, and means supporting said switch unit within said opening and connecting said switch unit to said pattern including at least one flexible and electrically conductive supporting means connected between said pattern and one of said terminals to cushion the transmission of force from said panel to said one terminal.

2. The switching assembly set forth in claim 1 in which said flexible and electrically conducting supporting means includes a first portion secured to said pattern and a second portion depending into said opening and secured to said one terminal.

3. A switching assembly comprising a dielectric supporting panel having an opening therein, a conductive circuit pattern formed on said panel, a sealed switch unit including an elongated dielectric housing and a terminal projecting from one end of said housing, said switch unit being disposed in said opening with said terminal also positioned within the opening, a supporting member formed of flexible and electrically conductive material and having a depending central portion and opposite end portions, the end portions of said supporting member resting on one surface of said panel with the depending central portion disposed in said opening, said terminal being supported by said depending central portion to cushion the transmission of forces to the terminal from the panel, and means connecting at least one of said end portions to said conductive circuit pattern.

4. A switching assembly comprising a dielectric panel having an opening therein, a conductive circuit pattern on said panel, a sealed switch unit having an elongated dielectric housing, said housing having a first terminal projecting from one end of said housing substantially along the axis of said housing and a second terminal projecting from said housing spaced radially from the axis of said housing, said switch unit being disposed in said opening wtih said second terminal resting on a surface of said panel and with said first terminal positioned within said opening, a flexible and electrically conductive supporting means having an end portion resting on a surface of said panel and a depending portion disposed in said opening, means securing said first terminal to said depending portion of said flexible supporting means, and means securing said second terminal and said end portion of the flexible supporting means to said conductive circuit pattern.

5. A switching assembly comprising a dielectric panel having an opening, a printed circuit on said panel including portions disposed adjacent the edges of said opening, a sealed switch unit including at least one terminal projecting from each end of an elongated dielectric housing, said switch unit being disposed in said opening with said terminals disposed adjacent said portions of the printed circuit, and connecting means for connecting said terminals to said printed circuit and for supporting said sealed switch unit on said panel, said connecting means including a generally U-shaped supporting member formed of flexible and electrically conductive material within which one of said terminals is positioned, said U-shaped member being connected at one point to one of said portions of the printed circuit and at another spaced point to said one terminal.

6. The switching assembly set forth in claim 5 in which said U-shaped member includes two spaced and generally parallel legs extending generally parallel to said panel and in which one of said legs is secured to said portion of the printed circuit and said other leg is secured to said one terminal.

7. The switching assembly set forth in claim 5 in which said U-shaped member includes a pair of legs extending generally transverse to said panel and in which one of said legs is secured to said portion of the printed circuit and said one terminal is connected to the bight of said U-shaped member.

8. A switching assembly comprising a dielectric panel, a conductive circuit pattern on said panel, a sealed switch unit including a sealed dielectric envelope in the opposite ends of which rigid terminals are sealed, and means for supporting said switch unit on said panel and for connecting said switch unit to said pattern including at least one flexible and electrically conductive supporting means formed in a generally U-shaped configuration and connected between said pattern and one of said terminals to cushion the transmission of force from said panel to said one terminal to avoid damage to the seal.

References Cited in the file of this patent

UNITED STATES PATENTS 3,038,976 Koda ------------------ June 12, 1962